(12) United States Patent
Schaefer

(10) Patent No.: US 7,207,433 B2
(45) Date of Patent: Apr. 24, 2007

(54) MOTOR-OPERATED CONVEYING ROLL, CONTROL DEVICE FOR A MOTOR-OPERATED CONVEYING ROLL, ROLLER CONVEYING SYSTEM AND CONTROL METHOD FOR A ROLLER CONVEYING SYSTEM

(75) Inventor: Gerhard Schaefer, Neunkirchen (DE)

(73) Assignee: SSI Schaefer Peem GmbH, Graz (AT)

( * ) Notice: Subject to any disclaimer, the term of this patent is extended or adjusted under 35 U.S.C. 154(b) by 0 days.

(21) Appl. No.: 11/303,021

(22) Filed: Dec. 16, 2005

(65) Prior Publication Data

US 2006/0151299 A1    Jul. 13, 2006

Related U.S. Application Data

(63) Continuation of application No. PCT/EP04/07138, filed on Jul. 1, 2004.

(30) Foreign Application Priority Data

Jul. 31, 2003    (DE) ................ 103 36 304

(51) Int. Cl.
    *B65G 13/06* (2006.01)
(52) U.S. Cl. ...................... 198/788; 198/789
(58) Field of Classification Search ................ 198/780, 198/788, 781.08, 789
    See application file for complete search history.

(56) References Cited

U.S. PATENT DOCUMENTS

| | | | |
|---|---|---|---|
| 3,362,760 A | 1/1968 | Sernetz | |
| 3,568,821 A * | 3/1971 | Gronkvist | 198/788 |
| 3,853,214 A * | 12/1974 | Vinarscik et al. | 198/780 |
| 5,088,596 A | 2/1992 | Agnoff | |
| 5,148,909 A | 9/1992 | Becker | |
| 6,035,999 A | 3/2000 | Hall | |
| 6,206,181 B1 | 3/2001 | Syverson | |
| 6,253,909 B1 | 7/2001 | Kalm | |
| 2001/0030110 A1 | 10/2001 | Axmann | |

FOREIGN PATENT DOCUMENTS

| | | |
|---|---|---|
| AT | 249576 B | 9/1966 |
| DE | 8430 A | 11/1954 |
| DE | 1 779 772 U1 | 12/1958 |
| DE | 38 44 591 C2 | 3/1980 |
| DE | 89 07 852 U1 | 9/1989 |
| DE | 92 05 861 U1 | 10/1992 |
| DE | 295 02 647 U1 | 5/1995 |
| DE | 44 30 614 A1 | 2/1996 |

(Continued)

OTHER PUBLICATIONS

Hi-tech conveyor treats packages with TLC, Machine Design, Apr. 9, 1992, pp. 18-19, Cleveland, Ohio, US.

*Primary Examiner*—James R. Bidwell
(74) *Attorney, Agent, or Firm*—McNeely IP Law; Kevin J. McNeely

(57) ABSTRACT

A motor-driven conveying roll for conveying systems includes a roll which is rotatably mounted with respect to a frame. A drive unit is fixed to the frame and the output shaft of the drive unit is frictionally connected to the inner surface of the hollow conveying roll by a pressure-exerting unit.

28 Claims, 6 Drawing Sheets

FOREIGN PATENT DOCUMENTS

| | | |
|---|---|---|
| DE | 198 41 608 A1 | 3/2000 |
| DE | 199 21 165 | 11/2000 |
| EP | 0 953 524 A2 | 3/1999 |
| EP | 1 118 558 A | 7/2001 |
| EP | 1 205 409 A | 5/2002 |
| GB | 1 573 564 A | 8/1980 |
| GB | 2 219 781 A | 12/1999 |
| WO | WO 99/00317 | 1/1999 |
| WO | WO 02/053481 A1 | 7/2002 |

* cited by examiner

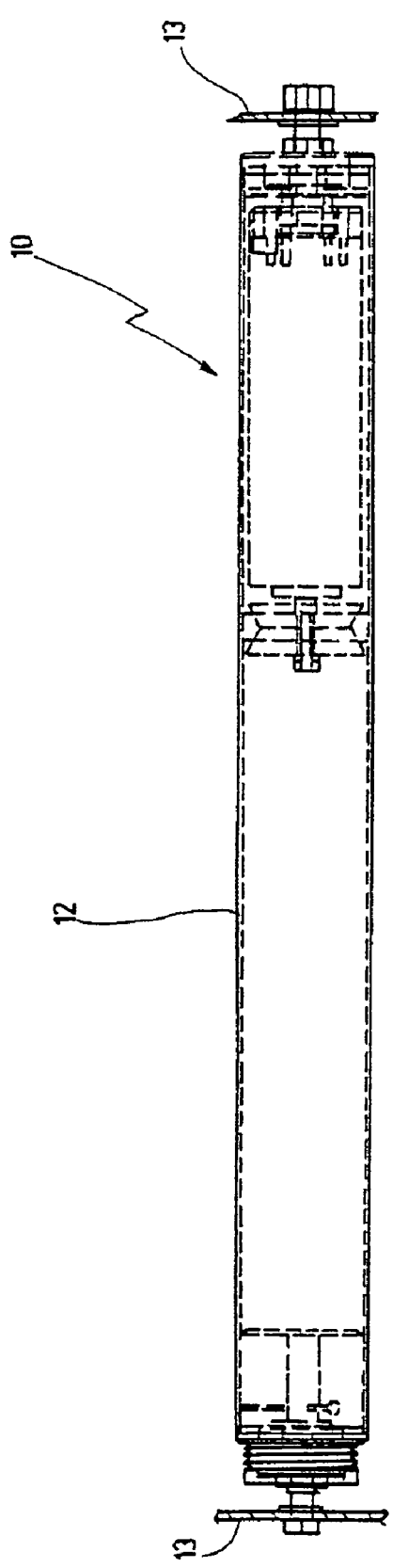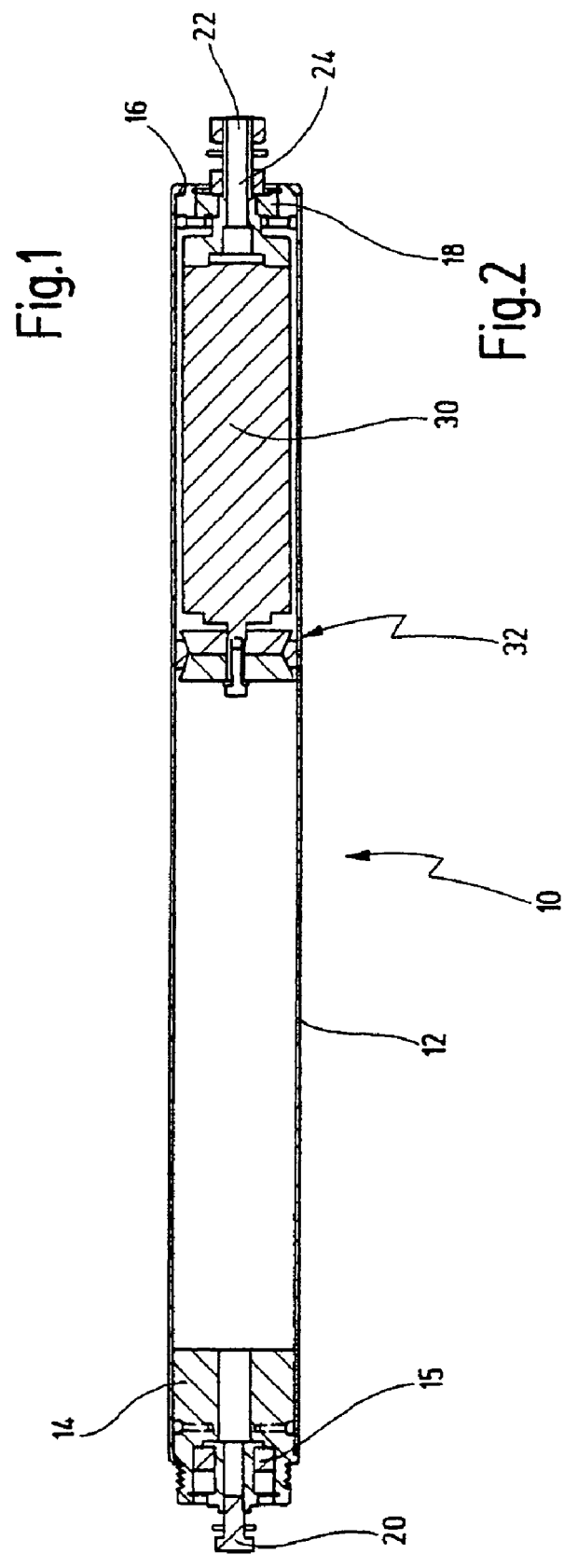

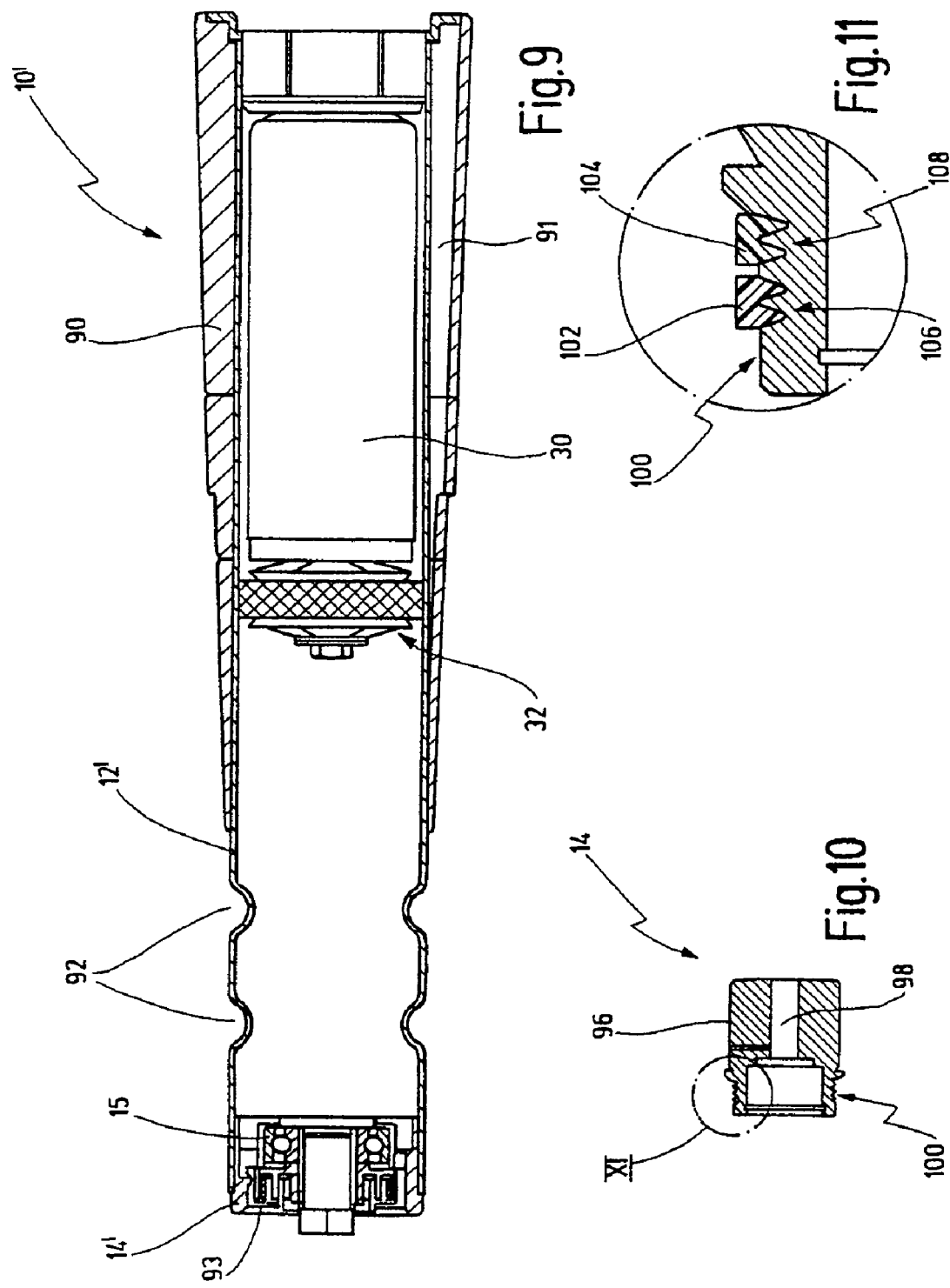

MOTOR-OPERATED CONVEYING ROLL, CONTROL DEVICE FOR A MOTOR-OPERATED CONVEYING ROLL, ROLLER CONVEYING SYSTEM AND CONTROL METHOD FOR A ROLLER CONVEYING SYSTEM

RELATED APPLICATIONS

This is a continuation application of co-pending International Patent Application PCT/EP2004/007138, filed Jul. 01, 2004, which claims priority of German application DE 103 36 304.1 filed on Jul. 31, 2003 which is fully incorporated by reference herewith.

BACKGROUND OF THE INVENTION

The present invention relates to a motor-operated conveying roll, a control device for a motor-operated conveying roll, a roller conveying system and a method for controlling a roller conveying system.

RELATED PRIOR ART

Roller conveying systems serve for transporting items to be conveyed, such as containers or pallets. In the following, any reference to a container can equally be applied to any other kind of item to be conveyed.

A roller conveying system has a plurality of rolls aligned in a transverse direction and lying one behind the other, at least some of which are driven. The drive of the rolls has the effect that the item to be conveyed that is lying thereon is moved in a conveying direction.

Such roller conveying systems serve for connecting different stations of a storage system, for example a transfer station to a container store or an order-picking station, etc.

In a group of subsequently arranged rolls, generally only one conveying roller is driven respectively. The other rolls of the group or of the segment are idling rolls, which are coupled to the motor-operated conveying roll by means of belts.

For driving the motor-operated conveying roll, it is known to arrange an electric motor, which is coupled to a spindle of the motor-operated conveying roll, on a frame on which the conveying rolls are rotatably mounted.

However, motor-operated conveying rolls, in which a drive unit including an electric motor and a reduction gear mechanism are integrated in a body of the roll, are also known (for example from DE 92 05 861 U1).

This known motor-operated conveying roll is mounted at its ends by means of bushes. The motor is fixed on a motor support inside the body of the roll, the motor support being formed as a bearing neck. Furthermore, the motor support is provided with a channel for leading through electrical lines for the connection of the electric motor.

A driven shaft, i.e. an output shaft, of the drive unit inside the body of the roll is frictionally connected to the inner circumference of the body of the roll by means of a pressure-exerting unit.

Such motor-operated conveying rolls are also referred to as "drive rolls".

Motor-operated conveying rolls of this type are controlled by means of control modules. These generally require a DC voltage supply and offer the possibility of setting the motor-operated conveying roll to different rotational speeds in stages. For this purpose, coding switches such as DIP switches are generally provided on the control modules. The control modules also allow the direction of rotation to be chosen.

For coupling with idling rolls, the body of the roll is provided with one or more beads, around which the belts can be wrapped.

U.S. Pat. No. 5,088,596 discloses a motorized conveyor roller comprising: a roller tube; means for rotatably mounting the roller tube in a conveyor frame; a motor mounted inside the roller tube, the motor being non-rotatable relative to the conveyor frame; a gear reducer mounted inside the roller tube and operatively connected to the motor, the gear reducer including an output shaft; a drive member having an outer periphery frictionally engaged with the inner wall of the roller tube for rotating the roller tube, the driving member being driven by the gear reducer output shaft.

In the light of the above background, it is an object of the present invention to provide an improved motor-operated conveying roll, an improved control device for such a motor-operated conveying roll, an improved roller conveying system and an improved method for controlling such a roller conveying system.

SUMMARY OF THE INVENTION

This object is achieved by motor-operated conveying rolls as claimed in claim 1 and 28, and a control device for a motor-operated conveying roll as claimed in claim 15.

In a preferred embodiment of the motor-operated conveying roll, on the outer circumference of the body of the roll, or a component connected to it (for example a bush), there is formed at least one W-shaped circumferential profile, around which a belt with at least two V-shaped ribs on the inner circumference (hereafter referred to as Poly-V™ belt for short) can be wrapped.

Belts of this type form an optimum contact surface for a higher transmission performance with the same width.

Also preferably used for driving the conveying roll are belts which have a special core, enabling them to maintain a tension throughout their entire service life once it has been set, so that maintenance work for re-adjusting the tension is not required.

According to a further preferred motor-operated conveying roll, the circumferential profile has a double-W shape for allowing reception of two Poly-V™ belts.

In this case, a coupling of the motor-operated conveying roll with two idling rolls on opposite sides is possible.

According to a further preferred embodiment, the component on which the W-shaped circumferential profile is formed is a bush, which is inserted into one end of the body of the roll and is rigidly connected therewith.

This allows the W-shaped profiling to be produced separately on the component.

It is of particular advantage in this respect if the component is made of plastic, so that a low weight is obtained.

According to a further preferred embodiment, the drive unit has an electric motor and a gear mechanism, an input of which is connected to the driven shaft of the electric motor and the driven shaft of which is connected in a rotationally fixed manner to the pressure-exerting unit.

This makes it possible to use a high-speed electric motor, a rotational speed of which is preferably reduced by means of the gear mechanism in order to achieve appropriate rotational speeds of the conveying roll.

According to a preferred embodiment, the driven shaft of the gear mechanism is, in this case, formed as a conical neck with an internal thread.

This makes it possible to connect the pressure-exerting unit to the driven shaft of the gear mechanism in such a way that the pressure-exerting unit centres itself in the axial direction of the body of the roll when it is fitted inside the body of the roll.

In this respect, it is of particular advantage if the pressure-exerting unit has first and second disks defining on the outer circumference define a V shape into which an elastic pressing ring is placed.

The V shape allows a radial force to be produced on the elastic pressing ring when an axial force is exerted on the disks, in order to fix the pressure-exerting unit on the inner circumference of the body of the roll with frictional engagement.

In this respect, it is of particular advantage if the disks are fitted onto the driven shaft with a conical outer circumference of the gear mechanism and a screw, which is screwed into the internal thread of said shaft, fixes the disks on the driven shaft and thereby presses the pressing ring radially against the inner circumference of the body of the roll.

According to a particularly preferred embodiment, the electric motor is a brushless DC motor. A motor of this type is maintenance-free throughout its service life.

It is of further advantage if the electric motor has magnets integrated into the motor.

This allows a high power output to be achieved with a comparatively small outside diameter of the electric motor.

Furthermore, it is advantageous if the drive unit has an electric motor which can be set in its rotational speed within a specific speed range.

This makes it possible to set the motor-operated conveying roll for different conveying speeds.

Furthermore, it is advantageous if the drive unit has a gear mechanism which has a fixed transmission ratio.

As a result, the gear mechanism can be of a compact construction.

It is of particular advantage in this respect if the drive unit has a gear mechanism which has a set of planetary gears with an internal gear made of plastic and planetary gears made of brass.

This achieves a particularly good compromise between durability and low running noise.

This applies all the more if the internal gear is helically toothed.

In the control device according to the present invention, it is advantageous if a plurality of control units for activating respective electric motors of a corresponding plurality of conveying rolls are arranged in the housing, the control units being supplied by the AC/DC converter (for example a power supply unit).

This makes it possible to supply the control device via regular power cables (for example 220 volts). The comparatively high costs for the AC/DC converter are in this case spread between the individual control units.

In higher power outputs, the supply lines for the control device (that is generally the power cable) can be formed with a much smaller cross section than the otherwise customary DC supply lines.

According to a further preferred embodiment, each control unit (i.e. the one control unit or number of control units of the preferred embodiment) respectively has a coding switch for setting the rotational speed of the electric motor to a fixed value.

This allows the rotational speed of the motor-operated conveying roll to be set according to the application. The coding switch may be, for example, a DIP switch and may also be suitable for setting the direction of rotation.

Furthermore, it is advantageous if a bus interface which is in connection with the control unit or units is provided on the housing.

By this measure it is possible to connect the control device (and its control unit or units) to a higher-level control system (for example a stored-program controller or the like) via a bus structure. This makes it possible to parameterize the control unit or units, for example with regard to speed, high-speed acceleration, etc. Furthermore, it is also possible to implement a higher-level conveying strategy, by a number of control devices of this type being suitably activated via the bus network.

In this respect, it is of particular advantage if each control unit is designed for receiving a rotational speed via the bus interface (generally in coded form) and setting the respective electric motor to the rotational speed received.

Here, the rotational speed of the connected motor-operated conveying roll can be centrally set, adjusted or optimized by a higher-level control system.

According to a further preferred embodiment, each control unit has a sensor input for a sensor, which is assigned to the respective conveying roll.

The sensor is preferably an occupancy sensor, which detects whether there is a container above the motor-operated conveying roll or just in front of it. However, the sensor may also be any other type of sensor that controls the operation of the control device.

It is of particular advantage if the sensor is an optical sensor, in particular an optocoupler.

In this respect, it is also of particular advantage if each control unit is designed for switching the assigned electric motor on and off in dependence on the sensor.

This makes it possible to set the motor-operated conveying roll in operation only when necessary. As a result, the noise level of a roller conveying system implemented in this way is reduced. The energy consumption is reduced.

It is particularly advantageous in this respect if each control unit is designed for switching the assigned electric motor on when a sensor signal is received from the sensor.

As a result, the motor-operated conveying roll is switched on whenever its operation is necessary, that is to say when the sensor has detected for example that a container is being conveyed onto it.

According to a further preferred embodiment, each control unit is designed for switching the assigned electric motor off a predetermined time period or a time period that can be set (for example can be set by the bus interface) after receiving a sensor signal from the sensor. This ensures that the motor-operated conveying roll is only in operation as long as a container is to be conveyed.

It is also possible to initiate the switching-off of the motor-operated conveying roll by means of a downstream sensor, that is to say whenever it is established by means of the sensor that there is no longer a container over the motor-operated conveying roll (or over idling rollers coupled with it).

It is also advantageous if each control unit is designed for switching the electric motor off when the assigned conveying roll is blocked.

This may take place for example by means of measuring the motor current. If the motor current exceeds a specific threshold value, the electric motor is switched off, since it is then assumed that the conveying roll is blocked.

In this respect, it is also of advantage if each control unit is designed for switching on again the electric motor a predetermined time period after switching off the motor on the basis of a blockage of the conveying roller.

This creates a situation in which the control unit regularly re-attempts to set the motor-operated conveying roll in operation. When the blockage of the conveying roll is removed, the motor-operated conveying roll continues its conveying operation quite normally. If the blockage continues, the electric motor is immediately switched off again. Once the predetermined time period has elapsed, it is then again attempted to switch it on.

The predetermined time period in this case advantageously lies in the range between 0.5 and 10 seconds, preferably in the range from 2 to 5 seconds (for example 3 seconds).

It is also advantageous if each control unit has a fault output for connection to a higher-level control system.

If a fault occurs within the control unit (for example failure of the electric motor or continued blockage of the conveying roll, etc.), a fault signal is switched on (for example via a relay). This can then be passed on to a higher-level control system, in order to indicate a fault to an operator.

It goes without saying that the features mentioned above and those still to be explained below can be used not only in the respectively specified combination but also in other combinations or on their own without departing from the scope of the present invention.

BRIEF DESCRIPTION OF THE DRAWINGS

Exemplary embodiments of the invention are explained in more detail in the description which follows and are represented in the drawing, in which:

FIG. 1 shows a schematic side view of a motor-operated conveying roll according to the invention;

FIG. 2 shows a longitudinal sectional view of the conveying roll of FIG. 1;

FIG. 9 shows a longitudinal sectional view through a further embodiment of a motor-operated conveying roll according to the invention, in the form of a conical roll;

FIG. 10 shows a longitudinal sectional view of a bearing bush for a motor-operated conveying roll according to the present invention;

FIG. 11 shows a detail XI of FIG. 10;

DESCRIPTION OF PREFERRED EMBODIMENTS

Figure 3:
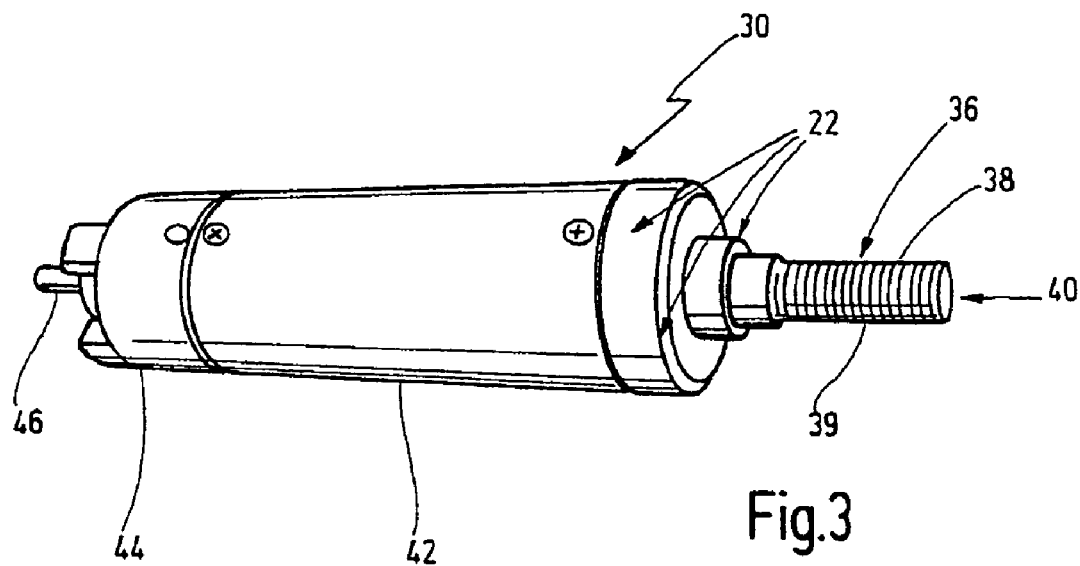
FIG. 3 shows a perspective view of a motor-operated conveying roll according to the invention.

In FIGS. 1 and 2, a first embodiment of a motor-operated conveying roll according to the invention is designated generally by 10.

The conveying roll 10 has a tubular hollow roller body 12, which may comprise, for example, a galvanized precision tube.

The roller body 12 is rotatably mounted on a schematically indicated frame 13.

For this purpose, the conveying roll 10 has a first bush 14, which is inserted in one end of the roller body 12 and is consequently rigidly connected. The bush 14 receives a bearing 15, which is rotatably mounted on a neck 20 of the frame 13.

At the opposite end, the conveying roll 10 has a second bush 16, which is mounted by means of a bearing 18 on a bearing element 22 in the form of a motor support. The motor support 22 is rigidly connected to the frame 13 and has a channel 24 connecting the interior of the roller body 12 to the outside.

Arranged in the interior of the roller body 12, alongside the motor support 22, is a drive unit 30, which generally has a cylindrical shape. The drive unit 30 is rigidly connected to the motor support 22 at its end facing the bush 16.

At the opposite end, the drive unit 30 is provided with a driven shaft, which is connected to a pressure-exerting unit 32. The pressure-exerting unit 32 is circumferentially frictionally connected to the inner circumference of the roller body 12.

Figure 4:
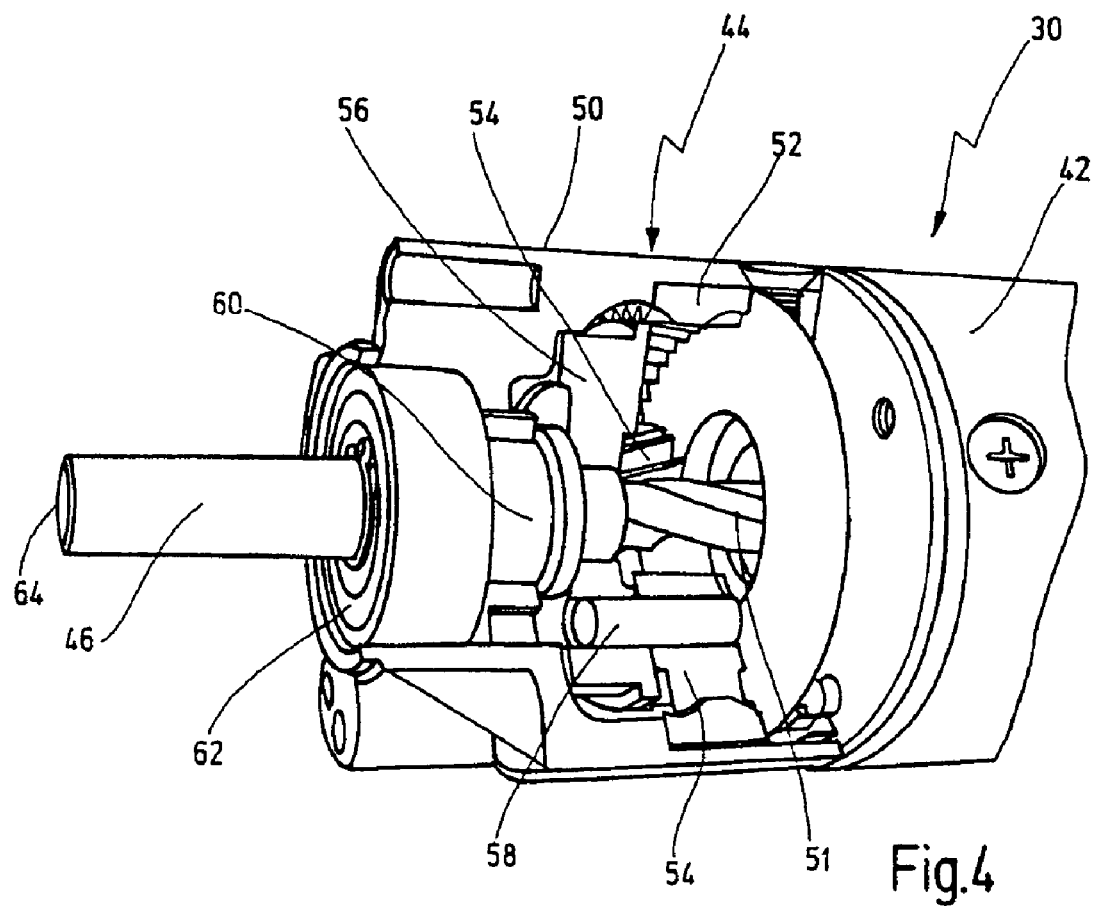
FIG. 4 shows a perspective partial sectional view of a gear mechanism of the motor-operated conveying roll of FIG. 3.

In FIGS. 3 and 4, the drive unit 30 is represented in greater detail.

The motor support 22 has a hollow neck 36 with an external thread 38, by means of which the motor carrier 22 can be connected to the frame 13. Furthermore, a flattening 39 is provided on the outer circumference of the hollow neck 36, in order to achieve better torque support.

The drive unit 30 also has an electric motor 42 in the form of a brushless DC motor, which is flange-mounted on the motor support 22.

Flange-mounted on the opposite end of the electric motor 42 is a gear mechanism 44, the driven shaft 46 of which is connected to the pressure-exerting unit 32.

The gear mechanism 44 has a housing 50, for example comprising a zinc die casting, which is generally formed in a hollow-cylindrical manner.

A driven shaft 51 of the electric motor 42 protrudes into the housing 50.

Fixed on the inner circumference of the housing 50 is an internal gear 52 made of a plastic, such as POM. The internal gear 52 is helically toothed.

The internal gear 52 is a component part of a set of planetary gears, the planetary gears 54 of which mesh with the driven shaft 51 of the electric motor 42. The planetary gears 54 are preferably produced from brass and, like the internal gear 52, are helically toothed.

A planet carrier 56 of the set of planetary gears provides a bearing for the planetary gears 54 by means of respective steel bearing needles 58, which may be hardened and ground smooth.

The driven shaft 51 of the electric motor 42 forms a sun gear.

The planet carrier 56 is formed as a disk which is formed alongside the internal gear 52 and is connected to the driven shaft 46 in a rotationally fixed manner. The driven shaft is mounted by means of a sintered bearing 60 with life-time lubrication and a ball bearing 62 (sealed).

The driven shaft 46 is hardened and ground and has a conical shape on the outer circumference, at least in certain portions.

Furthermore, the driven shaft is provided with a bore in the end face, with an internal thread 64.

Figure 5:
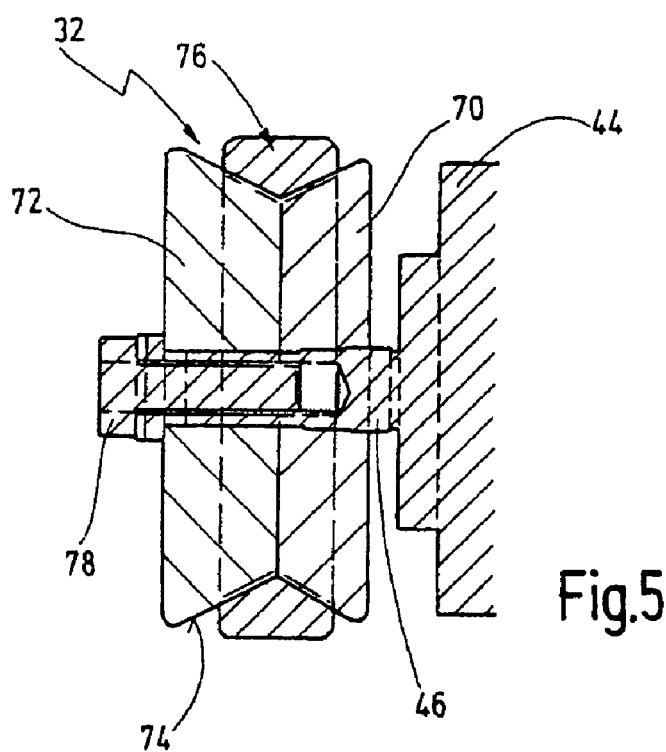
FIG. 5 shows a longitudinal sectional view of a pressure-exerting unit of a motor-operated conveying roll according to the invention.

In FIG. 5, the way in which the pressure-exerting unit 32 is linked to the driven shaft 46 is represented.

The pressure-exerting unit 32 has a first disk 70 and a second disk 72, which together define a V periphery 74. Placed around the V periphery 74 is a pressing ring 76 made of an elastic material (for example PUR).

Screwed into the internal thread 64 is a screw 78, which is designed for pushing the disks 70, 72 onto the conical driven shaft 46 and pressing them together on it. In this case, a circumferentially frictional press fit is set up between the disk 70 and the driven shaft 46. The other disk 72, on the other hand, is held on the driven shaft 46 in an axially movably manner on account of the conical shape.

For the assembly of the drive unit 30 and the pressure-exerting unit 32, the latter is pushed into the roller body 12 before insertion of the bush 16. Subsequently, the bush 16 is mounted with a bearing 18 on the hollow neck 36. However, the arrangement comprising the drive unit 30 and the bush 16 with the bearing 18 may also be preassembled.

In the pushed-in state, the disks 70, 72 are spaced apart from each other, so that the pressing ring 76 can be inserted into the inner circumference of the roller body 12 with play.

Subsequently, the screw 78 is tightened via the opposite end of the roller body 12. As this happens, the disk 72 is pressed against the disk 70. As a result of the V periphery 74, the pressing ring 76 is compressed and pressed radially outward, so that finally, on the one hand, a press fit of the disk 70 on the driven shaft 46 is achieved. At the same time, the pressing ring 76 presses from the inside circumferentially against the interior of the roller body 12 and in this way forms a frictional engagement between the driven shaft 46 and the roller body 12.

Furthermore, as a result, the driven shaft 46 of the drive unit 30 is mounted in the interior of the roller body 12, so that the roller body 12 can be rotated contactlessly with respect to the housing of the drive unit 30.

Figures 6, 7:
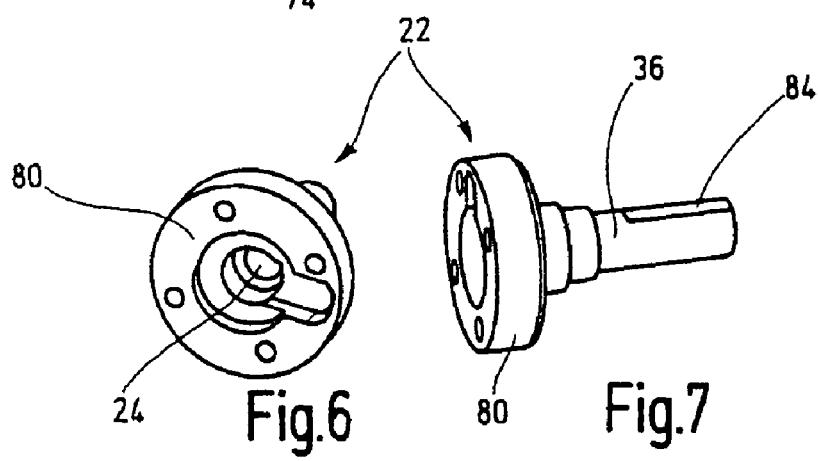
FIG. 6 shows a perspective view from behind of a motor support.
FIG. 7 shows a perspective view of the motor support of FIG. 6, seen from the side.
Figure 8:
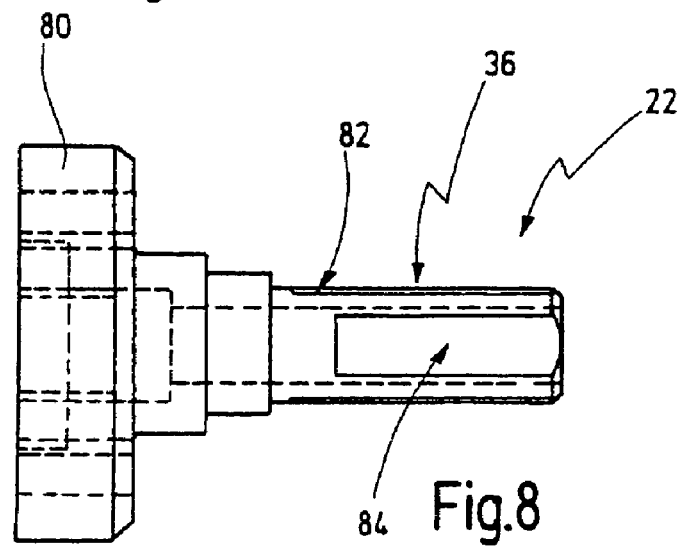
FIG. 8 shows a side view of the motor support of FIGS. 6 and 7.

The motor carrier 22 has a flange portion 80, which is connected to the electric motor 42. Furthermore, the motor carrier 22 has the channel 24 in the form of a central bore and the flattening 84 (reference numeral 39 in FIG. 3), as FIGS. 6, 7 and 8 reveal.

Furthermore, the hollow neck of the motor carrier 32 has an external thread 82 (which in FIG. 3 is designated by 38).

As stated, the electric motor is a brushless, three-phase DC motor with an internal rotor. In this case, magnets are integrated in the rotor.

Furthermore, three Hall sensors, which are used for speed control, are integrated in the electric motor 42.

A connector socket, which from the inside receives the electrical terminals of the electric motor 42 and from the outside (i.e. via the end face of the hollow journal 36) can be connected to a connector which connects the electric motor 42 to a control device, can be integrated into the motor carrier 22.

The electric motor 42 can be set in its rotational speed, for example in a speed range from approximately 1000 to 7000 revolutions per minute.

In this case, the electric motor may have a power output of 43 watts and a braking power of about 80 watts. The output torque may lie in the region of 0.1 Nm, with the peak torque around 0.27 Nm.

The gear mechanism 44 is provided with a fixed transmission ratio of i=9:1.

The motor carrier 22 is preferably produced from free-machining steel.

In FIG. 9, an alternative embodiment of a motor-operated conveying roll according to the invention is designated generally by 10'.

The conveying roll 10' corresponds in its construction and in its function to the conveying roll 10, so that only the differences are discussed below.

The conveying roll 10' has a generally tubular roller body 12'. A conical casing is slipped over an outer portion of the roller body 12', so that the conveying roll 10' is formed generally as a conical roller.

The casing 90 may consist of solid material or be formed as a conical tube with radial webs 91, as represented in FIG. 9.

Formed in a portion of the roller body 12' that is not covered by the casing 90 are two peripheral beads 92, which are designed for accepting belts for coupling with idling rollers.

The bush 16' includes a seal 93, which covers the interior of the roller body 12' including the bearing 15 with respect to the surroundings. It goes without saying that the conveying roll 10 of FIGS. 1 to 8 may also be provided with a seal of this type in the bushes 14, 16.

In FIGS. 10 and 11, the bush 14 of FIGS. 1 and 2 is represented in greater detail.

The bush 14 has a cylindrical inserting portion 96 for insertion into the interior of the roller body 12. The connection to the roller body 12 may take place for example by means of grub screws or the like.

Furthermore, the bush 14 has an axial bore 98.

The bush 14 is formed in such a way that a driving portion 100, protruding axially from the roller body 12, is provided. Within the driving portion 100, a widened opening may be provided for receiving the bearing 15 and/or the seal 93.

Provided on the outer circumference of the driving portion 100 are two W profiles 106, 108, which lie alongside each other in the axial direction and are designed for accepting a respective Poly V belt 102, 104, which are available, for example, from the Hutchinson company.

It goes without saying that, instead of a W profile, a multiple V profile may also be formed on the outer circumference of the bush 14, to allow Poly V belts with more than two V-shaped inner ribs to be accepted.

In comparison with conventional belts, the Poly V belts 102, 104 have an increased contact surface with respect to the conveying roll 10. This allows higher torques to be transmitted. The Poly V belts 102, 104 also generally incorporate an inner carrier or core, which ensures that there is no significant drop in the tension of the belt throughout its service life. As a result, the Poly V belt is substantially maintenance-free over its service life.

Figure 12:
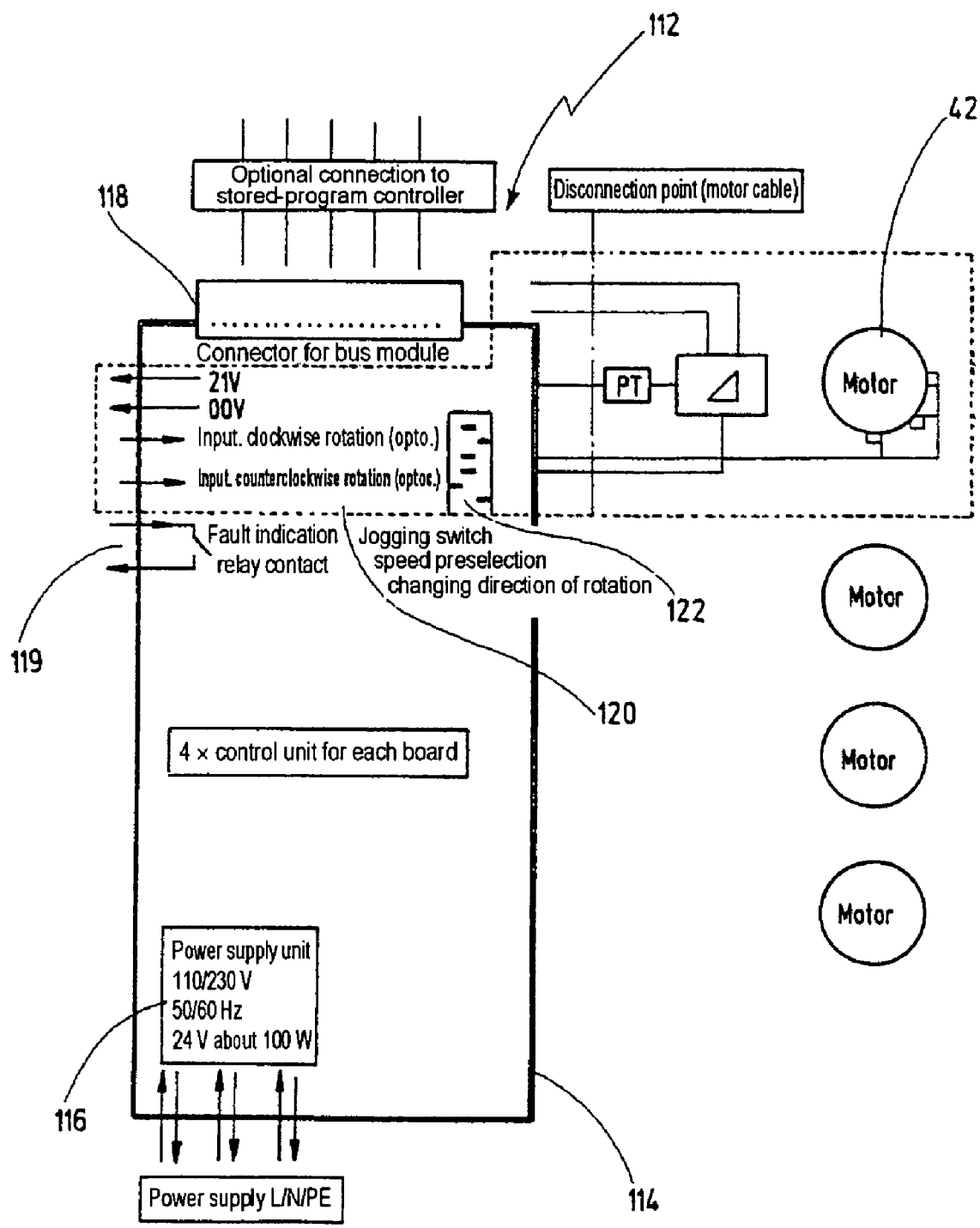
FIG. 12 shows a schematic view in the form of a block diagram of a control device according to the invention for a motor-operated conveying roller.

In FIG. 12, an embodiment of a control device according to the invention for four motor-operated conveying rolls 10 is designated generally by 112.

The control device 112 has a housing 114, in which an AC/DC converter in the form of a power supply unit 116 is accommodated. The power supply unit serves for converting customary system voltage (110/230 volts) into a DC voltage of, for example, 24 volts.

Also provided on the housing 114 is a bush interface 118 for the optional connection to a higher-level control system (for example a stored-program controller). The bus interface may be designed for any desired type of bus, preferably for the process fieldbus.

Furthermore, the control device 112 has four control units 120 for activating four electric motors 42 of respective motor-operated conveying rolls 10. However, it goes without saying that, in principle, the control device may also have only one control unit 120, or any other desired number of control units 120.

In FIG. 12, only one control unit 120 is shown for reasons of providing a clear representation.

Furthermore, a fault-signal terminal 119 is provided on the housing 114. If a fault occurs within the control device 112, a fault signal is emitted via the fault-signal terminal 119. In the preferred embodiment, this takes place via a relay contact, which shorts two lines leading from the higher-level control system to the control device 112.

Each control unit 120 has a DIP switch 122 for setting different speed stages (speed preselection) and for setting the direction of rotation of the motor 42.

It goes without saying that the DIP switch 122 may be connected in a conventional way to a resistor network or the like, in order to supply the motor 42 with different voltages according to the speed preselection.

Furthermore, each control unit 120 has a supply output for electrically supplying an assigned sensor and also two inputs for feeding sensor signals (not designated any more specifically in FIG. 12). One of the inputs is designed for clockwise rotation, the other for counterclockwise rotation of the motor 42.

The sensor may preferably be an optical sensor, for example an optocoupler.

The power supply unit 116 serves for jointly supplying the control units 120 of the control device 112 and also for supplying the connected sensors.

It goes without saying that the control device 112 can be operated without connection to a higher-level control system, that is without a bus link.

In this case, the speed of the motor 42 is preset before start-up via the DIP switch 122.

It is possible by means of the sensor assigned to each control unit 120 to switch the motor 42 on and off according to requirements.

For the explanation it is assumed below that a motor-operated conveying roll 10 forms a conveying segment together with any idling rolls that may be coupled to it.

If no container travels over the conveying segment (there is no sensor activation), the conveying segment is switched off automatically after a short delay. This automatic switching-off takes place in the respective control unit 120. Alternatively, it is also possible to provide the control unit 120 with a logic circuit, which switches the conveying segment off on the basis of a sensor activation (whenever the sensor is arranged downstream of the conveying segment in the conveying direction).

Generally, however, the control unit 120 is realized with a delayed switch-off. The reactivation takes place by means of the conveying segment's own sensor (which is connected to the control unit 120) and is arranged upstream of the conveying segment in the conveying direction. Alternatively, the reactivation takes place by means of a preceding conveying segment.

The advantages of the segmentally autonomous switching on and off according to requirements are lower mechanical wear and consequently a longer service life. Lower noise generation and a lower energy requirement are obtained.

The motor-operated conveying roll and the idling rolls possibly connected to it may be designed for a conveying weight of up to 50 kg. This allows speeds in the range between 0.3 meters per second and two meters per second to be realized. A stepless or stepped speed setting is possible. Only one type of motor is necessary for the entire speed range. An increase in power output can be subsequently realized with little expenditure, as can an increase in speed, even with nonintelligent control.

Furthermore, the control units 120 are respectively designed for actively braking the motor-operated conveying rolls 10, the respective electric motor 42 being connected into the operation of the generator.

Figure 13:
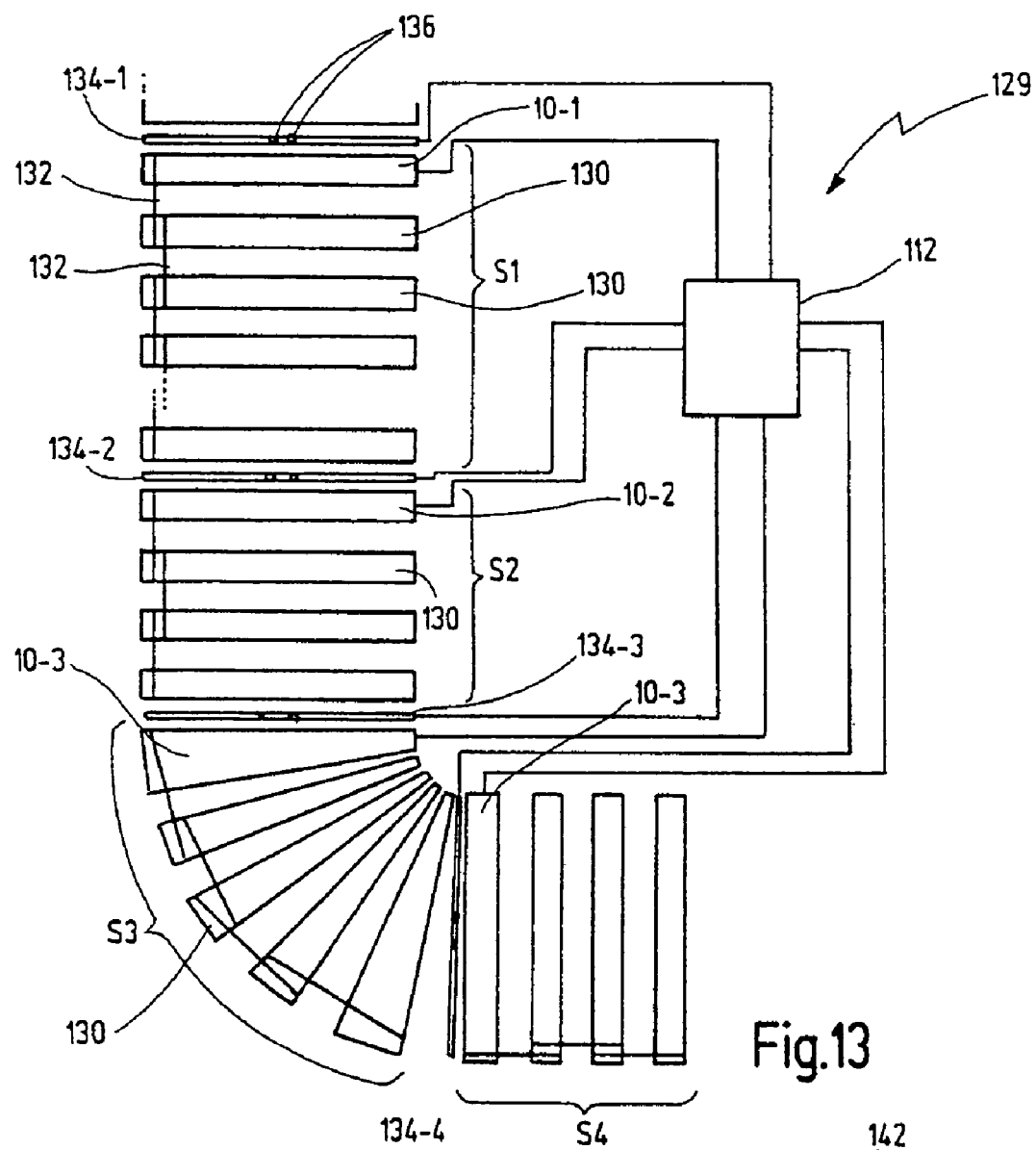
FIG. 13 shows a plan view of a roller conveying system according to the invention.

FIG. 13 shows a schematic plan view of a roller conveying system 129 according to the invention.

The roller conveying system 129 has four conveying segments S1, S2, S3, S4. The conveying segments S1, S2, S4 are provided with cylindrical conveying rolls. The conveying segment S3 is provided with conical conveying rolls.

Each conveying segment has a motor-operated conveying roll 10, which is coupled with respective idling rolls 130, to be precise by means of belts 132.

The motor-operated conveying rolls 10 preferably comprise the motor-operated conveying rolls 10, 10' of FIGS. 1 to 11. However, other types of motor-operated conveying rolls may also be used.

The motor-operated conveying rolls 10 of the segments S1, S4 are connected to a control device 112. This may be formed, for example, by the control device 112 represented in FIG. 12.

Furthermore, each conveying segment S1 to S4 is assigned a sensor bar, which is arranged between an idling roll of a preceding conveying segment and the respective motor-operated conveying roll. The sensor bars are designated in FIG. 13 by 134. The sensor bars 134 respectively have an optical sensor in the form of an optocoupler 136, which can detect whether or not a container is arranged over the respective sensor bar 134. The sensors 136 are connected to the control device 112.

As soon as a container, for example, travels over the sensor bar 134-1, the directly downstream motor-operated conveying roll 10-1 is switched on (and rotates at a predetermined speed). By means of the coupling belts 132, the idling rolls 130 are also driven. The container is accordingly conveyed by means of the conveying segment S1 in the conveying direction to the next conveying segment S2. When it travels over the next-following sensor bar 134-2, the conveying segment S2 is switched on, etc. The control device 112 likewise ensures that the motor-operated conveying rolls 10 are switched off a predetermined time after being traveled over by a container. As a result, segmentally autonomous switching on and off appropriate for requirements is realized.

In FIG. 4, a further roller conveying system with a plurality of conveying segments S1 to S6 arranged one behind the other is schematically represented.

Containers 140 are conveyed over the segments S1 to S6 in a conveying direction 142.

Figure 14:
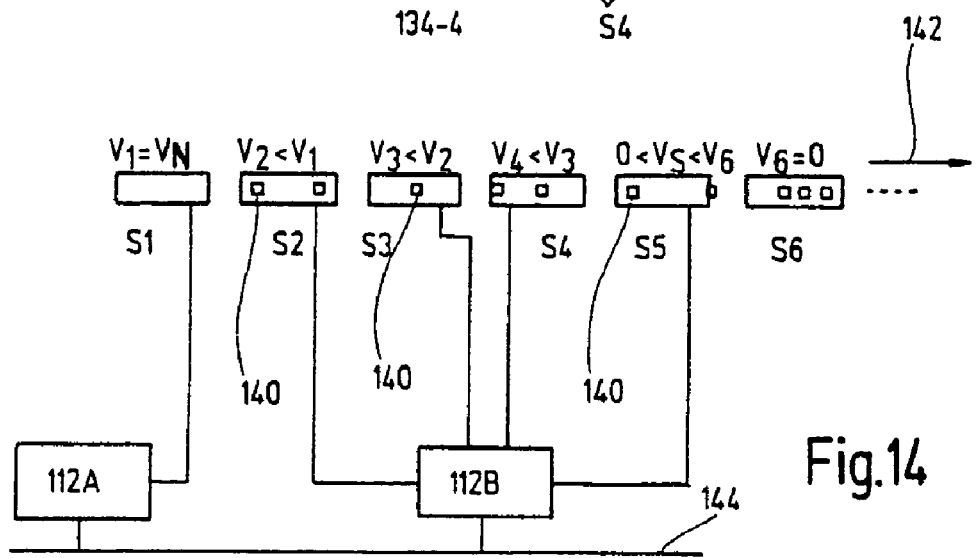
FIG. 14 shows a schematic representation to explain the control method according to the invention for a roller conveying system.

In each case four segments are assigned to a control device 112. The control devices (in FIG. 14: 112A and 112B) are connected to one another by means of a bus 144 (for example process fieldbus).

If a backlog occurs at one conveying segment (as schematically represented at the conveying segment S6), the conveying speed of the segment can be reduced, for example to To avoid the following containers 140 "running into" the backlog, the control devices 112A, 112B are activated via the bus 144 in such a way that the speeds of the upstream conveying segments are set all the lower the closer these conveying segments are to the backlog segment S6.

If it is assumed that a conveying segment being located far upstream conveys with its nominal speed ($V_1=V_N$), consequently the conveying segments S2 to S5 located in between are set to respective speeds which are respectively lower than that of the upstream conveying segment. Thereby the effect is achieved that the speed of the containers 140 is gradually reduced from the segment S1 conveying at nominal speed to the backlog segment S6. As a result, this already prevents start/stop operation of the containers 140 in advance.

This is achieved by the throughput being calculated for each segment. An evaluation takes place and signaling to the segments located behind for automatic reduction/adaptation of the conveying speed. This adaptation of the conveying speed is intended to be reproduced dynamically contrary to the conveying direction.

A precondition for this is, of course, that the rotational speed of the motor-operated conveying rolls 10 can be freely set in a range that is as wide as possible (for example 0.3 to 2 m/sec). In this case, the speed control of the control units 120 is largely load-independent.

This produces a maximization of the throughput. Containers are prevented from running into one another. The wear usually caused by stop/start operation is reduced. Furthermore, a lower energy requirement and lower noise generation are obtained.

I claim:

1. A motor-driven conveying roll for conveying containers in a conveying system, comprising:
   a hollow roller body having inner and outer circumferences;
   means for rotatably mounting said roller body in a conveying frame;
   a drive unit which is mounted within said roller body, said drive unit being non-rotatable relative to said conveying frame and having an output shaft; and
   a pressure-exerting unit, said output shaft of said drive unit being frictionally connected to said inner circumference of said roller body by means of said pressure-exerting unit;
   wherein said pressure-exerting unit has first and second disks defining on an outer circumference thereof a V-shape, into which an elastic pressing ring is placable.

2. The motor-driven conveying roll as claimed in claim 1, wherein at least one W-shaped circumferential profile is formed on said outer circumference of said roller body, wherein a Poly-V belt is placeable around said W-shaped circumferential profile.

3. The motor-driven conveying roll as claimed in claim 1, wherein at least one W-shaped circumferential profile is formed on an outer circumference of a further component which is externally connected to said roller body.

4. The motor-driven conveying roll as claimed in claim 2, wherein the circumferential profile has a double-W shape receiving two Poly-V belts.

5. The motor-driven conveying roll as claimed in claim 3, wherein said component is a bush which is inserted into one end of said roller body and is rigidly connected thereto.

6. The motor-driven conveying roll as claimed in claim 3, wherein said component is made of plastic.

7. The motor-driven conveying roll as claimed in claim 1, wherein said drive unit has an electric motor and a gear mechanism, an input of which is connected to an output shaft of said electric motor and an output shaft of which is connected in a rotationally fixed manner to said pressure-exerting unit.

8. The motor-driven conveying roll as claimed in claim 7, wherein said output shaft of said gear mechanism is formed as a conical neck having an internal thread.

9. The motor-driven conveying roll as claimed in claim 8, wherein said disks are fitted onto said output shaft, said output shaft having a conical outer circumference, of said gear mechanism, and a screw is screwed into an internal thread of said output shaft for fixing said disks on said output shaft and thereby pressing said pressing ring radially against said inner circumference of the roller body.

10. The motor-driven conveying roll as claimed in claim 7, wherein said electric motor is a brushless DC motor.

11. The motor-driven conveying roll as claimed in claim 10, wherein said electric motor has magnets integrated into the rotor.

12. The motor-driven conveying roll as claimed in claim 1, wherein said drive unit has an electric motor, a rotational speed of which is adjustable within a specific speed range.

13. The motor-driven conveying roll as claimed in claim 1, wherein said drive unit includes a gear mechanism which has a set of planetary gears with an internal gear made of plastic and planetary gears made of brass.

14. The motor-driven conveying roll as claimed in claim 13, wherein the internal gear is helically toothed.

15. A control device for a motor-driven conveying roll for conveying containers in a conveying system, said motor-driven conveying roll comprising: a hollow roller body having inner and outer circumferences; means for rotatably mounting said roller body in a conveying frame; a drive unit which is mounted within said roller body, said drive unit being non-rotatable relative to said conveying frame and having an output shaft; and a pressure-exerting unit, said output shaft of said drive unit being frictionally connected to said inner circumference of said roller body by means of said pressure-exerting unit; wherein said pressure-exerting unit has first and second disks defining on an outer circumference thereof a V-shape, into which an elastic pressing ring is placable; said control device further comprising: a housing; an interface to said drive unit, said drive unit comprising an electric motor; a control unit for controlling said drive unit; and an AC/DC converter for converting a system voltage into a DC voltage for supplying said control unit.

16. A control device as claimed in claim 15, wherein a plurality of control units for controlling respective electric motors of a corresponding plurality of conveying rolls is arranged in the housing, the control units being supplied by the AC/DC converter.

17. The control device as claimed in claim 16, wherein each control unit respectively has a coding switch for setting a rotational speed of the electric motor to a fixed value.

18. The control device as claimed in claim 15, wherein a bus interface, which communicates with the control unit or units, is provided on the housing.

19. The control device as claimed in claim 18, wherein each control unit is adapted for receiving a rotational speed via the bus interface and setting the respective electric motor to the rotational speed received.

20. The control device as claimed in claim 15, wherein each control unit comprises a sensor input for a sensor, which is assigned to the respective conveying roll.

21. The control device as claimed in claim 20, wherein each control unit is adapted for switching the assigned electric motor on and off in dependence on a sensor signal from the sensor.

22. The control device as claimed in claim 21, wherein each control unit is adapted for switching on the assigned electric motor when a sensor signal is received from the sensor.

23. The control device as claimed in claim 21 or 22, wherein each control unit is adapted for switching off the assigned electric motor a predetermined time period or a time period that can be set after receiving a sensor signal from the sensor.

24. The control device as claimed in claim 21, wherein each control unit is adapted for switching off the electric motor when the assigned conveying roll is blocked.

25. The control device as claimed in claim 24, wherein each control unit is adapted for switching on again the electric motor a predetermined time period after switching off the motor on the basis of a blockage of the conveying roll.

26. The control device as claimed in claim 25, wherein the predetermined time period is in the range from 0.5 to 10 seconds, preferably in the range from 2 to 5 seconds.

27. The control device as claimed in claim 15, wherein each control unit comprises a fault output for connection to a higher-level control system.

28. A motor-driven conveying roll for conveying containers in a conveying system, comprising:
    a hollow roller body having inner and outer circumferences;
    means for rotatably mounting said roller body in a conveying frame;
    a drive unit which is mounted within said roller body, said drive unit being non-rotatable relative to said conveying frame and having an output shaft; and
    a pressure-exerting unit, said output shaft of said drive unit being frictionally connected to said inner circumference of said roller body by means of said pressure-exerting unit;
    wherein at least one W-shaped circumferential profile is formed on said outer circumference of said roller body, and wherein a Poly-V belt is placeable around said W-shaped circumferential profile.

* * * * *